J. CHAMBERLIN.
TRUCK FOR RAILWAY CARS.
APPLICATION FILED FEB. 10, 1911.
993,755.
Patented May 30, 1911.
2 SHEETS—SHEET 1.
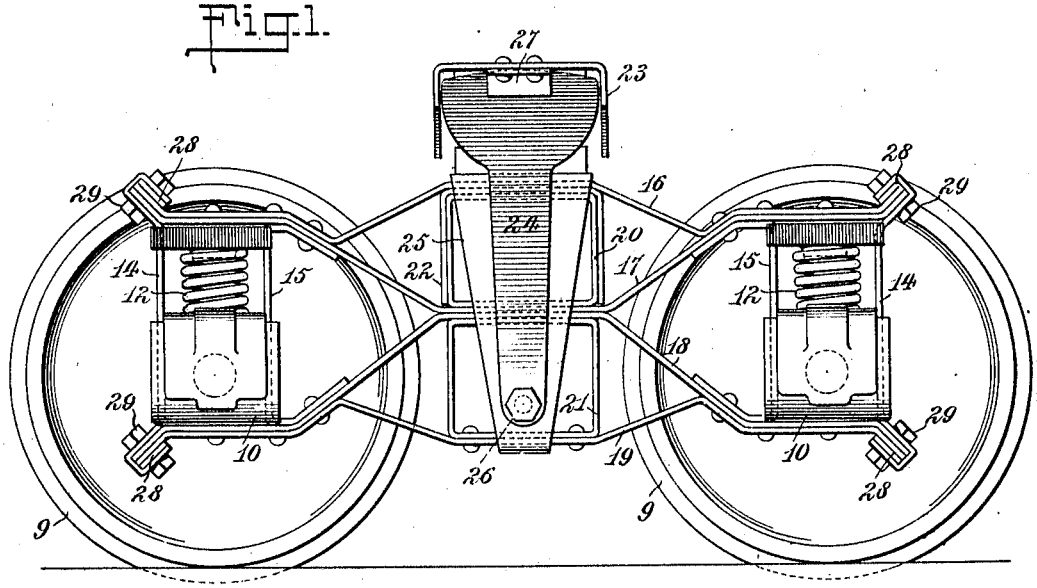
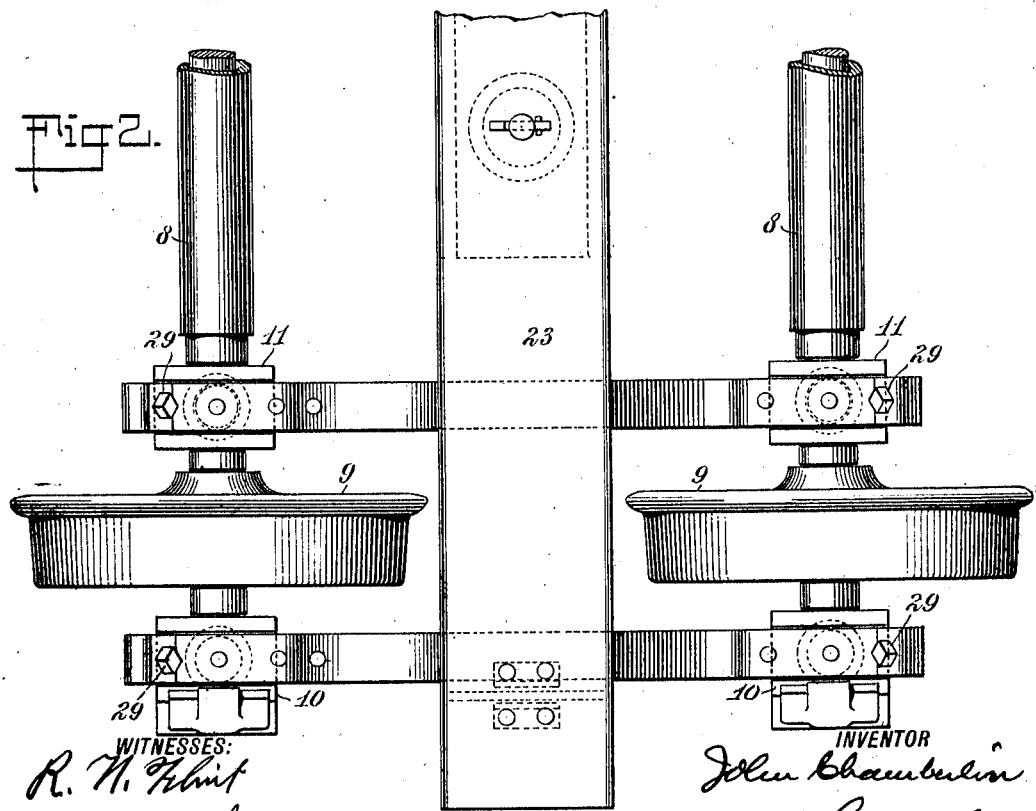
WITNESSES:
R. N. Flint
H. M. White.
INVENTOR
John Chamberlin
BY
ATTORNEY

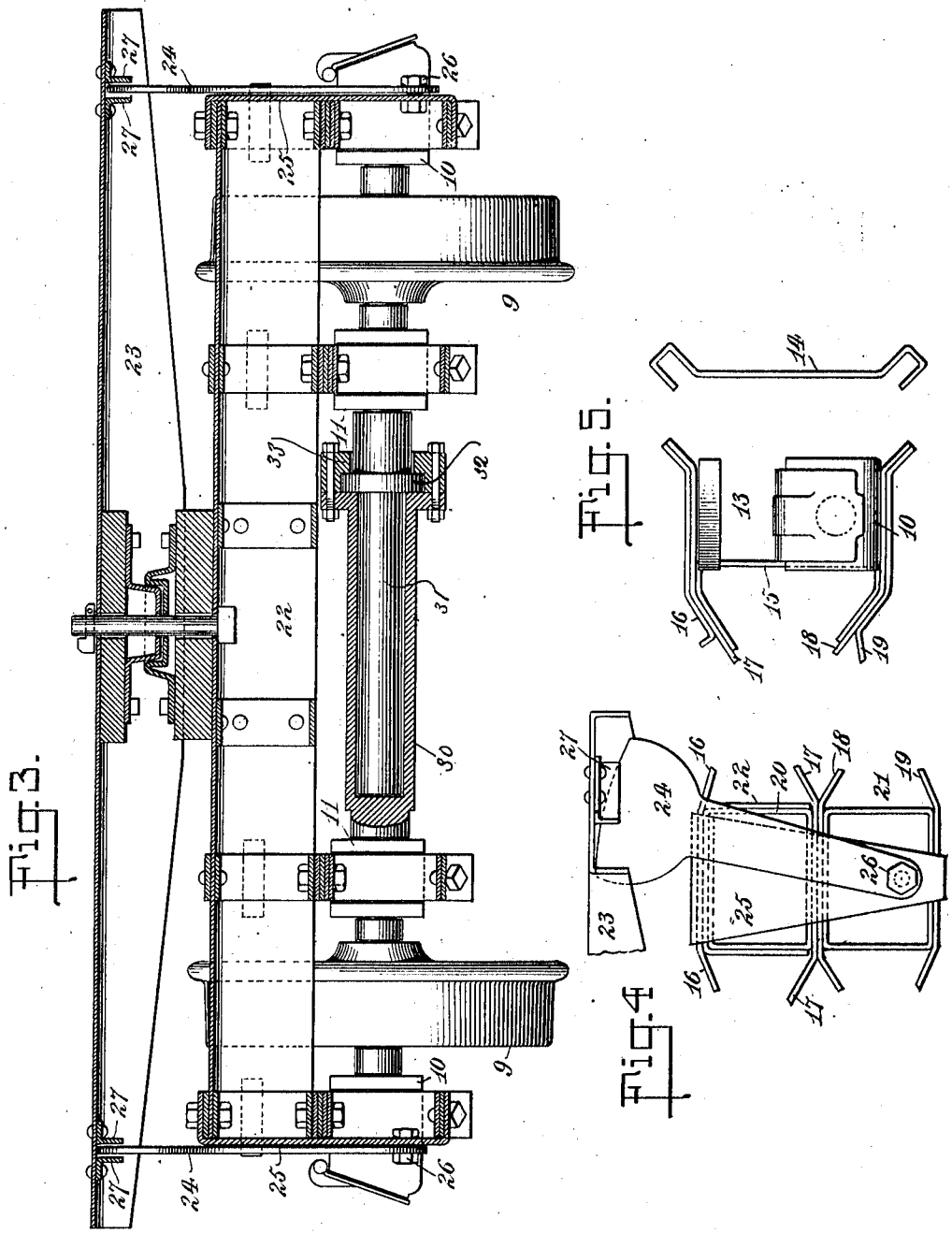

UNITED STATES PATENT OFFICE.

JOHN CHAMBERLIN, OF SUFFERN, NEW YORK, ASSIGNOR OF ONE-HALF TO ALBERT H. KELSALL, OF SUFFERN, NEW YORK.

TRUCK FOR RAILWAY-CARS.

993,755.  Specification of Letters Patent.  Patented May 30, 1911.

Application filed February 10, 1911. Serial No. 607,813.

*To all whom it may concern:*

Be it known that I, JOHN CHAMBERLIN, a citizen of the United States, and a resident of Suffern, in the county of Rockland and State of New York, have made and invented certain new and useful Improvements in Trucks for Railway-Cars, of which the following is a specification.

My invention relates to trucks for railway cars, and the object thereof is to provide a truck in which the journal boxes in which the axles rotate, and consequently the axles and wheels carried thereby, may be easily removed from the truck for purposes of renewal or repair; to provide the truck with improved bolster mechanism, to provide a truck of simple construction and one which may be easily manufactured; and to provide such other improvements in and relating to railway car trucks as are hereinafter referred to and described.

With the above and other objects in view, my invention consists in the improved truck for railway cars illustrated in the accompanying drawing, described in the following specification, and particularly claimed in the clauses of the concluding claim, and in such modifications thereof as will be obvious to one skilled in the art to which my invention relates.

In the drawings accompanying and forming a part of this application: Figure 1 is a view illustrating my improved truck as seen in side elevation; Fig. 2 is a view showing about one-half of the truck in plan; Fig. 3 is a view showing a section taken upon a transverse vertical plane passing through the bolster of the truck and located midway between the pairs of wheels; Fig. 4 is a fragmentary view illustrating details of one of two supports located one upon each side of the truck and adapted to support the ends of the bolster; and Fig. 5 is a fragmentary view illustrating details of the side frame wherein the journal boxes are supported.

In the drawings, 8 represents two axles such as are commonly provided in trucks for railway cars, and 9 are the truck wheels. Each axle 8 is provided with a journal at its ends which rotate in journal boxes 10 of common or ordinary form and located outside the wheels, and with other journals between the wheels which rotate in journal boxes 11 of common or ordinary form and located between the wheels, all these journal boxes being supported from the main frame of the truck and the journal boxes being movable vertically against the force of springs 12 to thereby cushion abrupt movements of the car body one end of which is supported from the truck as will be understood. Thus it will be seen that a journal and journal box is provided upon each side of the several car wheels with which the truck is provided whereby the axles are greatly stiffened and a stronger truck procured.

The form of framing may be varied considerably and the same is not of the essence of my invention. The frame is, however, so formed that the journal boxes and axles may be removed from the frame by a horizontal movement, to which end the frame is provided with recesses the open ends of which are in vertical planes and one of which is shown at 13, Fig. 5; and the open ends of these recesses are closed by vertically extending cover plates 14 which extend across the recesses and hold the journal boxes 10, 11 in place as will be understood. The cover plates 14 and the vertical back or bottom wall of the recess 13 form guides for the journal boxes within the recesses as they move up or down, such movement being permitted by the springs 12 located within the recesses.

The cover plate 14 is detachably secured to the frame of the truck, and, when released therefrom, may be moved bodily in a horizontal direction. This permits the journal boxes and axles to be removed from the frame of the truck by simply lifting the truck so that the wheels are clear of the track, and then removing the cover plates 14 and moving the journal boxes and axle in a horizontal direction, an excessive elevation of the truck such as has generally been required being thus avoided.

As above stated, the form of the truck frame is of secondary importance. As shown, the truck frame is in the form of a double truss, the two trusses being superposed, with suitable interposed braces, the truss members being shown at 16, 17, 18 and 19, and the braces at 20, 21. These members are formed from bars of mild steel bent into proper form and secured together by rivets so as to form a single unitary trussed frame member, four of which are used in the entire truck frame as will be understood from Figs.

2 and 3, they being connected with one another to form the frame of the truck by means of a transverse beam 22 formed preferably from pressed steel and to which all said truss members are connected.

A bolster 23 is pivotally supported at the middle portion of the beam 22 as best shown in Fig. 3, and 24 are two vertically extending supporting members, one at either side of the truck, the lower ends of which are pivotally supported from the truck and the upper ends of which serve as supports for the ends of the bolster 23. In the form of trussed frame shown, plates 25 are secured to the truss members to which plates the lower ends of the supporting members 24 are pivotally connected by means of a bolt 26. The upper ends of the supporting members are in rocking engagement with the under side of the bolster 23, the said upper ends being preferably curved so as to maintain a constant length of supporting member, whatever may be the position assumed by the said members. The upper ends of the supporting members are restrained from lateral movement by stops 27 secured upon the under side of the bolster and between which the upper ends of said members lie.

28 are filling pieces, or wedges, which, when removed after removing the bolts 29, loosen the cover plate or guide 14 to such an extent that it may be detached from the ends of the truss members which constitute the truck frame.

The supports above referred to prevent the ends of the bolster from tipping and thus keep the car body level or in parallel relation with the plane of the tracks, the bearings provided upon each side of each wheel secure a strong truck, and the removable cover plates permit the journal boxes and axles to be conveniently removed from the truck as above explained.

The axles 8 employed in my improved truck are divided or two-part axles of the type disclosed and claimed in my copending application filed February 10, 1911, Serial No. 607,812, although it will be understood that other types of divided axle may be used with my truck, or that continuous or solid axles may be used. As shown, the axle 8 is made in two parts, one of which has a hollow or sleeve portion 30 of considerable length while the other part has a projecting portion 31 which is rotatable within the sleeve portion 30. The part which has the projecting portion 31 has also a flange 32, and 33 is a ring in engagement with the flange 32 and secured to the portion of the axle which has the sleeve portion by means of bolts as shown, whereby the two parts of the axle while free to rotate relative to one another are prevented from longitudinal movement and a single unitary axle is procured, all as explained at length in my copending application above referred to. The provision of double bearings one upon each side of each wheel as hereinbefore disclosed is of particular advantage in trucks having divided or two-part axles as the two parts of the axle being provided with two journals and the truck frame with two journal boxes in which said journals rotate, the said axle is thus more effectively supported, and a stronger truck secured, than were two bearings only provided for each divided axle. No claim is, however, made to the divided axle itself in this application as the same is claimed in my application above referred to.

Having thus described my invention and explained the operation thereof, I claim and desire to secure by Letters Patent:

1. In a truck for railway cars, a suitable frame adapted to support journal boxes for axles upon which the wheels are secured, said frame including superposed diamond trusses forming side members and a transverse beam connecting said side members; a bolster pivotally supported at the center of said transverse beam; a vertically extending plate secured to said side members and two vertically extending oscillating supporting members, one for each end of said bolster, the lower ends of said supports being pivotally connected with said vertically extending plate and the upper ends thereof being in engagement with the ends of said bolster to thereby support the same.

2. In a truck for railway cars, a suitable frame adapted to support journal boxes for axles upon which the wheels are secured, said frame including superposed diamond trusses forming side members and a transverse beam connecting said side members; a bolster pivotally supported at the center of said transverse beam; said bolster being of box-like form and open upon its under side and two vertically extending oscillating supporting members, one for each end of said bolster, the lower ends of said supports being pivotally connected with said frame and the upper ends thereof being of a width corresponding with the internal width of said bolster and in rocking engagement with the under side of said bolster to thereby support the same.

3. In a truck for railway cars, a suitable frame adapted to support journal boxes for axles upon which the wheels are secured, said frame including superposed diamond trusses forming side members and a transverse beam connecting said side members; a bolster pivotally supported at the center of said transverse beam; a vertically extending plate secured to said side members and two vertically extending oscillating supporting members, one for each end of said bolster, the lower ends of said supports being pivotally connected with said vertically extending plate and the upper ends thereof being curved and in rocking engagement with the under side of said bolster to thereby support the same, said bolster being provided on its under side and at each of its ends with means for preventing the upper ends of said supporting members from moving in a transverse direction.

4. In a truck for railway cars, a suitable frame adapted to support journal boxes for axles upon which the wheels are secured, said frame including a transverse beam; a bolster pivotally supported at the center of said transverse beam; said bolster being of box-like form and open upon its under side, and two vertically extending oscillating supporting members, one for each end of said bolster, the lower ends of said supports being pivotally connected with said frame and the upper ends thereof being of a width corresponding with the internal width of said bolster and in rocking engagement with the underside of said bolster to thereby support the same, said bolster being provided on its under side and at each of its ends with means for preventing the upper ends of said supporting members from moving in a transverse direction.

5. In a truck for railway cars, an axle formed in two parts, said parts being rotatable with reference to one another, and each of which parts carries a wheel; two journals upon each of the parts of said axle, one journal being located upon each side of each of said wheels; journal boxes in which said several journals rotate; a suitable frame in which said journal boxes are supported; and means whereby the two parts of said axle are connected together to thereby form a single unitary axle, said means being carried by said unitary axle, and the same being independent of said frame.

6. In a truck for railway cars, an axle formed in two parts, one of which parts is provided with a hollow or sleeve portion and the other of which has a projecting portion extending into and rotatable within said sleeve portion, said second mentioned part having a flange; means engaging said flange and secured to said first mentioned part for preventing longitudinal movement of said two parts; two journals upon each of the parts of said axle, one journal being located upon each side of each of said wheels; journal boxes in which said several journals rotate; and a suitable frame in which said journal boxes are supported.

7. In a truck for railway cars, two parallel axles, each formed in two parts, said parts being rotatable with reference to one another, and each of which parts carries a wheel; two journal boxes upon each of the parts of each of said axles, one journal being located upon each side of each of said wheels; journal boxes in which said several journals rotate; a suitable frame in which said several journal boxes are supported; means whereby the two parts of each of said axles are connected together to thereby form single unitary axles, said means being carried by said unitary axles, and the same being independent of said frame.

Signed at Suffern, town of Ramapo, in the county of Rockland and State of New York, this 4th day of February A. D. 1911.

JOHN CHAMBERLIN.

Witnesses:
  EVELYN E. HALDEMAN,
  MAY E. HALDEMAN.